Oct. 13, 1964     F. E. TAYLOR     3,152,914
METHOD OF PRODUCING SMOKE OIL AND PRODUCT
Filed Aug. 22, 1963
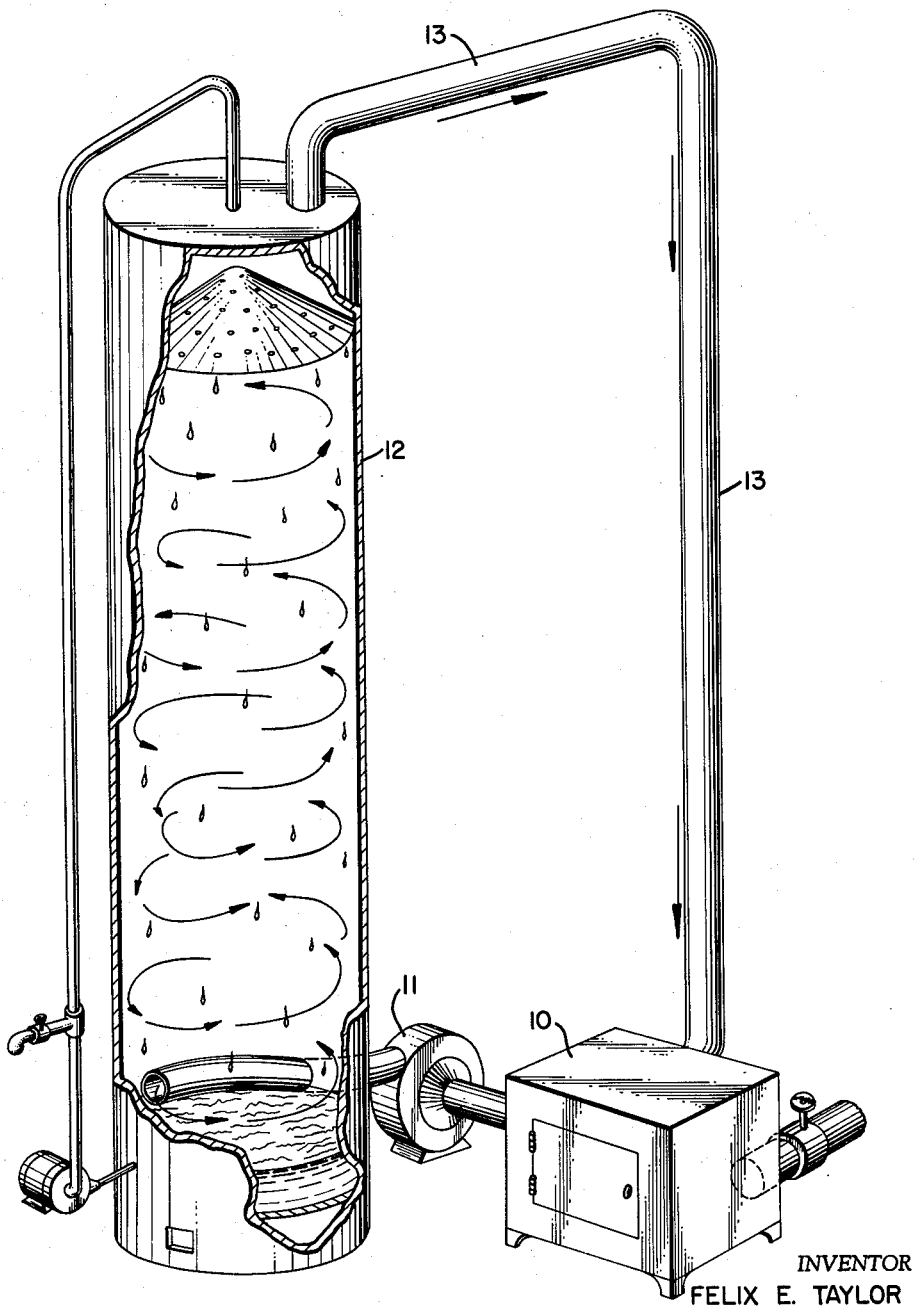
INVENTOR
FELIX E. TAYLOR
BY *William A. Mikesell Jr*
ATTORNEY

United States Patent Office 3,152,914
Patented Oct. 13, 1964

3,152,914
METHOD OF PRODUCING SMOKE OIL
AND PRODUCT
Felix E. Taylor, 400 N. Newman St., Shattuck, Okla.
Filed Aug. 22, 1963, Ser. No. 304,723
9 Claims. (Cl. 99—140)

This invention relates to condensed smoke. In one aspect, the invention relates to method for condensing a smoke resulting from oxidation of plant matter, and to products formed thereby. In another aspect, the invention relates to method for manufacturing a comestible oil condiment, and to the product thus made. In still another aspect, the invention relates to a stabilized smoke-oil, and to method for producing same.

Since the earliest times, an accepted method in the preparation of meat and fish foods has been the imparting of a smoked flavor thereto. The smoke from various woods, such as hickory, cedar, orangewood, and the like, has a pleasing odor in a diluted form. Likewise, the smoke from such woods has the property of imparting a pleasant taste to foods that are exposed thereto, but only if the smoke has been permitted to flavor the food between relatively narrow critical limits.

Thus, in the past, it has been common practice for certain individuals, normally farmers or ranchers, to set up smokehouses in which meats, such as hams, were exposed to the smoke from hickory or other specific woods. Certain persons operating individually in a community would gain certain local recognition for their smoked meat products, and their recognition was dependent on the individuals being so adept in the art of smoking food products that they were able to control the operation to obtain products having not only a pleasing flavor, but a flavor that was substantially uniform and characteristic of all food products smoked by them. Accordingly, it will be seen that in the past the smoking of food products was largely individual operations, and operations that required the constant attention and skill of particular persons.

Heretofore, the production of fully smoked food products had to be subjected to the direct smoke of the burned wood or other desirable vegetable matter for a lengthy period of time, relying on skill for uniformity. Only partial condensation of the many flavor elements found in smoke is obtainable by other known conventional methods of liquifying smoke. Therefore, some of the delicate flavoring elements are lost. Foods treated by these precipitates do not reflect the full benefit of natural smoke. Even some of the volatile elements are missing in the direct smoking method. It has also been discovered that fatty meats absorb smoke flavors faster in greater amounts than do lean meats.

While smoking food products by individuals in their own particular manner is sufficient to provide a small quantity of individually smoked fish, turkeys, hams, etc., for a luxury market, it cannot be adapted to the commercial production of food products that are retailed in the low and medium priced merchandising field. Food products sold in the low and medium priced field, if of a smoked flavor, must be of a flavor that is uniform in smoke taste and odor to all of the products so sold.

The burning of wood such as orangewood, cedar, oak, hickory and the like, results in essential oils that form a part thereof escaping from the wood due to volatilization during the burning process. It is these volatile essential oils, most of which are insoluble in water, that impart the smoke flavor to fish and meat exposed to the smoke from burning wood. Some woods and plants contain oil forming elements undesirable for food flavoring, such as turpentine, etc.

Therefore, to impart a uniform smoke odor and taste to food products produced commercially in large quantities, it is essential that but a certain specific quantity of these derived volatile oils be added to each unit of the food product mechandised. In the past, the adding of such quantities to food products to produce the uniform odor and taste desired has been impossible, due to the conventional methods used to condense smoke to liquid and retain it in a true oily form.

Accordingly, it is an object of my invention to provide a method for producing a crude smoke-oil concentrate of uniform strength. It is another object of my invention to provide a stabilized smoke-oil and a method of manufacturing the same. It is another object of my invention to provide an edible smoke-oil product which is adaptable for use in a wide variety of food products to impart a characteristic taste thereto. It is yet another object of my invention to provide a method of condensing smoke to an oil useful in flavoring food products, or a base for usage in other products.

Other aspects, objects, and the several advantages of my invention will become apparent to one skilled in the art upon study of this disclosure, the appended claims, and the drawing in which the sole figure is a schematic view of an apparatus suitable for carrying out my invention.

According to my invention, there is provided a method for producing smoke-oil which comprises burning plant matter in a confined zone with sufficient oxygen to sustain flaming combustion, and circulating the combustion products into a condensing zone maintained at a pressure and temperature moderately above atmospheric and thence back to said combustion zone at a lowered pressure and temperature in a continuous manner for a time sufficient to produce an oily product in the condensing zone while separating water vapor in a gaseous state. I have discovered, surprisingly, that by operation in this manner I am enabled to produce a highly flavorful crude oily product which is suitable for flavoring and tenderizing food products in the condition in which it is formed or which can be suitably diluted for final use. In a presently preferred embodiment of my invention, I stabilize my crude smoke-oil by condensing it in the presence of finely divided droplets of another edible oil, such as peanut oil, soya oil, cottonseed oil, or wheat germ oil. The thus-stabilized product has less tendency to "cook off" when used, for example, in the presence of heat such as during barbecue cooking.

Reference is now made to the drawing for a more complete understanding of my invention. The drawing illustrates one apparatus suitable for carrying out my invention. In the drawing, 10 is a stove or closed receptacle equipped with suitable dampers to control the added free-oxygen-containing gas needed to support full combustion of the plant matter to ashes. The total vaporous products of combustion are withdrawn by a blower 11 and forced into a second closed receptacle 12. Vessel 12 is maintained at a pressure somewhat above atmospheric by coaction of blower 11 and a suitable baffle or choking device near the downstream end of vessel 12. The non-condensed portion of the combustion products is then returned by way of conduit 13 under partial vacuum to the stove 10. It can thus be readily seen from the drawing that vessels 10 and 12 and their associated conduits comprise a loop or circuit, through which gases are circulated by means of blower 11. A perforated baffle situated in an upper portion of vessel 12 can serve not only as the choking or back-pressure device but also as a suitable liquid distributor for operation according to a presently preferred embodiment which I will now describe.

According to this embodiment, vessel 12 is charged with a suitable quantity of an edible oil, such as peanut oil or the like, at the beginning of a run. This oil is sufficient to form a pool in the bottom of the vessel, but not sufficient to rise to the level of the smoke inlet from blower 11. Then, while combustion products are being circulated as described previously, oil is withdrawn from the pool in the bottom of vessel 12 and pumped up so that it is allowed to spray or otherwise fall on the perforated baffle previously described. From this baffle, the peanut oil descends in droplets countercurrent to the rising combustion products. At the end of a run, i.e., when a given amount of plant product has been burned, the oil charge is withdrawn as product. This material comprises a stabilized crude smoke-oil.

I have also discovered that I am able to vary the type of products made by my process by varying the pressure and temperature in vessel 12. Thus, although I normally operate so as to produce primarily an oil product, I can by lowering the pressure or the temperature in vessel 12, or a combination of both, produce a two-phase product which comprises a lower aqueous layer and an upper oleaginous layer. I can also produce a heavy tarry or resinous product, which unlike products derived by destructive distillation of woody or plant matter, contains no creosote.

Unlike commercially available flavoring "liquid smokes," my product contains oils of aromatic esters varying according to the type of plant burned, which can however be maintained at a constant concentration for a given type of plant matter from one run to the next. Although, as I have stated, I prefer to stabilize my crude smoke-oil product by use of another oil, I can produce a pure crude smoke-oil without the use of a stabilizing oil. This latter concentrated product cannot, surprisingly, then be added to another oil such as peanut oil in as large be an amount without separation as will be incorporated by use of the preferred countercurrent contact embodiment described. Both my concentrated product and my stabilized product incorporate all the products of smoke combustion except water, the greatest portion of which condenses in the return line and is found in the ashes of the stove.

The crude smoke-oil product which forms in vessel 12 is apparently the result of cohesion and aggregation of the volatile combustion products; the microscopic particles of carbon formed by combustion also apparently serve as nuclei on which condensation occurs. This condensate, while descending through the rising smoke, in turn serves to absorb and otherwise collect additional product, until it descends to the bottom as an oil product.

Reference is now made to the following specific example for a more complete understanding of my invention.

About 400 lbs. of hickory wood (measured on a dry basis) was gradually added to the stove of an apparatus similar to that described. A charge of 100 gal. of peanut oil had previously been placed in the bottom of vessel 12. Peanut oil was continuously circulated and allowed to descend through vessel 12 while the combustion products were continuously circulated and allowed to ascend through the same vessel. Temperature in vessel 12 was maintained between 100 and about 125 degrees F., and pressure was about 0.3125 inch manometer mercury gauge. The charge hickory weighed about 800 pounds on a moist basis. After about 24 hours, combustion of the wood was completed, and there was recovered about 104 gallons of oily, water-insoluble product highly suited for use in imparting a smoked flavor to foods.

I have made other runs in which the temperature in the vessel 12 was allowed to drop below about 100 degrees F. As mentioned previously, this product contained a separate aqueous phase which had an acid-like flavor. When the temperature is allowed to drop to about 50 or 60 degrees F. in vessel 12, and the pressure to about one atmosphere, I obtain additionally a waxy or resinous product. One the other hand, when pressure or temperature are increased, the crude smoke-oil product apparently contains gases condensed into it which render it more flammable and also unsuitable as a condiment. Suitable pressures in the condensing zone range from about 0.25 to about 0.35 inch mercury gauge. By burning wood or plants containing oily substances undesirable for foods, an oil product suitable for other uses can be produced.

Reasonable variation and modification are possible within the scope of this disclosure and appended claims.

This application is a continuation-in-part of my application Serial Number 139,574, filed September 18, 1961, now abandoned, which is a continuation-in-part of my application Serial Number 15,056, filed March 15, 1960, and now abandoned, which is a continuation-in-part of my Serial Number 692,242, filed October 23, 1957, and now abandoned, which is a continuation-in-part of my Serial Number 489,967, filed February 23, 1955, and now abandoned.

I claim:

1. The method of producing smoke-oil suitable for use as a condiment which comprises burning wood in a closed burning zone with oxygen-containing gas sufficient to effect substantially complete combustion of said wood, passing substantially the entire combustion products of said burning to a condensing zone maintained at a temperature and pressure moderately elevated above ambient ranging between about 100 and about 125° F. and about 0.25 to about 0.35 inch mercury gauge, removing gases from said condensing zone and returning same under partial vacuum to said closed zone, and continuously circulating gas through the loop comprising said closed burning zone and said condensing zone for a time sufficient to produce an oleaginous concentrate in said condensing zone.

2. The method of claim 1 wherein the smoke-oil is stabilized by contacting the smoke in said condensing zone with finely divided droplets of an edible oil of higher boiling range than that of said smoke-oil.

3. The method of claim 2 wherein said edible oil is peanut oil.

4. The method of claim 3 wherein said wood is hickory.

5. The method of producing smoke-oil suitable for use as a condiment which comprises burning wood in an enclosed burning zone, passing free-oxygen-containing gas to said burning zone at a rate sufficient to maintain flaming combustion, withdrawing from said burning zone substantially the entire products of combustion including minute particles of free carbon, passing the thus-withdrawn products to a condensing zone, maintaining in said condensing zone conditions of temperature and pressure moderately elevated above atmospheric ranging from about 100 to about 125° F. and from about 0.25 to about 0.35 inch mercury gauge, withdrawing from said condensing zone a gaseous stream, and continuously circulating gas through the loop comprising said burning zone and said condensing zone for a time sufficient to effect formation of a oleaginous liquid in said condensing zone.

6. The method of claim 5 further characterized by contacting the combustion products in said condensing zone with finely divided droplets of an edible oil having an initial boiling point above that of said oleaginous liquid.

7. The method of claim 6 wherein said edible oil is peanut oil and wherein said plant matter is hickory wood.

8. The method of claim 7 wherein said oleaginous liquid contains essentially the total non-aqueous portion of the combustion product of at least about four pounds hickory on a dry basis per gallon of peanut oil.

9. The product according to the method of claim 1.

References Cited in the file of this patent
UNITED STATES PATENTS

| | | |
|---|---|---|
| 2,078,639 | Rohrmann | Apr. 27, 1937 |
| 2,464,614 | Sala | Mar. 15, 1949 |
| 2,611,311 | Irwin | Sept. 23, 1952 |
| 2,670,295 | Ash | Feb. 23, 1954 |
| 2,722,482 | Betts | Nov. 1, 1955 |
| 2,789,914 | Davis | Apr. 23, 1957 |
| 3,106,473 | Hollenbeck | Oct. 8, 1963 |